(12) United States Patent
Adebayo et al.

(10) Patent No.: US 10,138,715 B2
(45) Date of Patent: Nov. 27, 2018

(54) WELL-BORE AND RESERVOIR MONITORING PROCESS BY LOGGING TEMPERATURE AND RESISTIVITY

(71) Applicants: KING FAHD UNIVERSITY OF PETROLEUM AND MINERALS, Dhahran (SA); King Abdulaziz City for Science and Technology, Riyadh (SA)

(72) Inventors: Abdulrauf Rasheed Adebayo, Dhahran (SA); Hasan Yousef Al-Yousef, Dhahran (SA); Mohamed Mahmoud, Dhahran (SA); Abdullah Saad Sultan, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 452 days.

(21) Appl. No.: 14/856,089

(22) Filed: Sep. 16, 2015

(65) Prior Publication Data
US 2017/0074093 A1 Mar. 16, 2017

(51) Int. Cl.
*E21B 47/06* (2012.01)
*E21B 41/00* (2006.01)
(Continued)

(52) U.S. Cl.
CPC .......... *E21B 41/0064* (2013.01); *C09K 8/528* (2013.01); *E21B 47/065* (2013.01); *E21B 47/102* (2013.01); *E21B 47/1005* (2013.01)

(58) Field of Classification Search
CPC .......... E21B 49/00; E21B 47/065; E21B 49/08
See application file for complete search history.

(56) References Cited

U.S. PATENT DOCUMENTS

| 6,115,671 A * | 9/2000 | Fordham .............. G01N 24/081 324/303 |
| 7,055,604 B2 | 6/2006 | Jee et al. |
| 8,430,162 B2 | 4/2013 | Kotsonis et al. |

FOREIGN PATENT DOCUMENTS

GB 2 362 462 A 11/2001

OTHER PUBLICATIONS

Adebayo, A. R., et al., "An Experimental Investigation of the Use of Combined Resistivity and Temperature Logs for Scale Monitoring in Carbonate Formations During $CO_2$ Sequestration", J. Energy Resour. Technol., vol. 137(3), Total 3 Pages, (Oct. 23, 2014).

(Continued)

*Primary Examiner* — Zakiya W Bates
(74) *Attorney, Agent, or Firm* — Oblon, McClelland, Maier & Neustadt, L.L.P.

(57) ABSTRACT

A well-bore monitoring process involving logging the temperature of a soil, rock, and brine mixture present in a carbonate formation continuously, and simultaneously logging the resistivity of the soil, rock, and brine mixture in the carbonate formation continuously. The logged temperature and the logged resistivity are interpreted whereby concurrent events in the logged temperature and the logged resistivity identify dissolution of rock into the mixture and precipitation of scale from the mixture. The simultaneous logging of the temperature and the resistivity is conducted in a well-bore in the carbonate rock formation.

14 Claims, 15 Drawing Sheets

(51) Int. Cl.
*C09K 8/528* (2006.01)
*E21B 47/10* (2012.01)

(56) References Cited

OTHER PUBLICATIONS

Adebayo, A. A., et al., "The Prospect of Using Permanent Downhole Sensors for Monitoring Oilfield Scales", International Petroleum Technology Conference, Total 2 Pages, (2014).

* cited by examiner

WELL-BORE AND RESERVOIR MONITORING PROCESS BY LOGGING TEMPERATURE AND RESISTIVITY

STATEMENT OF ACKNOWLEDGEMENT

This project was funded by King Fand University of Petroleum & Minerals and King Abdul-Aziz City of Science and Technology under project number KACST-TIC-CCS-6.

BACKGROUND OF THE INVENTION

Technical Field

The present invention relates to a well-bore monitoring process involving logging the temperature and resistivity of a soil, rock, and brine mixture in a carbonate rock formation continuously to identify the formation of scale.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A common production or injection problem in $CO_2$ sequestration projects is scale formation in reservoirs and around injection and production wells, which hampers formation injectivity and productivity. Scales plug formation pores, throats and well perforations. Scales also deposit on downhole pumps, tubings, casing, flowlines, valves, separators, and many other production facilities. Scales are formed as a result of depressurization, or reaction of formation fluids. See Smith, J. K., Yuan, M., Lopez, T. H., Means, M., and Przbylinski, J. L., 2004, "Real-time and in situ detection of Calcium carbonate scale in a west Texas oil field," SPE Production & Facilities, May, pp. 94-99, incorporated herein by reference in its entirety. Common oil field scales include calcium carbonate, calcium sulfate, barium sulfates, and strontium sulfate.

Temperature, pressure, and pH variation, are the driving forces for oil field scale formation. Several scale management techniques exist, such as chemical treatment. Chemical treatment involves injection of scale inhibitors, such as chelating agents, inorganic phosphates, and phosphonates into formation water at concentrations high enough to prevent scale formation. Frequent and continuous geochemical analysis of produced formation water and petrographic analysis of cuttings for the purpose of monitoring the presence of scaling ions is another part of scale management. Such analyses allow surface engineers to detect when and where scale inhibitors will have an optimal effect. The use of computer models to predict scaling tendency is also common but does not replace empirical monitoring processes. Sources of concern with these methods include high cost, possible unsuccessful inhibition strategy, and susceptibility of surface analysis to errors. Other problems include compositional change with time of produced fluid caused by evolution of dissolved gases (e.g. $CO_2$), scale precipitation, co-precipitation of scaling ions with suspended solids, and microbial actions. Hence, computer modeling does not effectively capture the dynamics of produced water chemistry. Other field tested online techniques have been reported in the literature namely: ultrasonic (See Gunarathne, G. P. P., and Keatch, R. W., 1995, "Novel technique for monitoring and enhancing dissolution of dissolution of mineral deposits in petroleum pipelines", Paper SPE 30418 presented at the SPE offshore Europe Conference, Aberdeen, 5-8 September, incorporated herein by reference in its entirety), pulsed spectral gamma logs (See Wyatt, D. F., Jacobson, L. A., and Fox, P., 1994, "Use of supplemental curves from pulsed spectral gamma logs to enhance log interpretation," Paper SPE 28410 presented at the SPE annual technical conference and exhibition, New Orleans, 25-28 September, incorporated herein by reference in its entirety), dual energy venture multiphase flow measurements (See Theuveny, B. et al. 2001, "Detection and identification of scales using dual energy/venture subsea or topside multiphase meters," Paper OTC 13152 presented at the 2001 Offshore Technology Conference, Houston, 30 April-3 May, incorporated herein by reference in its entirety), gamma ray attenuation (See Bamforth, S. et al., 1996, "Revitalizing Production Logging," Oil field review, 8 (4), pp. 44-60, incorporated herein by reference in its entirety), and attenuated total reflectance. Some real-time monitoring techniques have also been tested in the laboratory such as rotating disc electrode (See Morizot, A. P. and Neville, A. 2000, "A novel Approach for monitoring of $CaCO_3$ and $BaSO_4$ scale formation," Paper SPE 60189 presented at the 2000 SPE second International Symposium on Oilfield Scale, Aberdeen, 26-27 January, incorporated herein by reference in its entirety), tapered optical fiber, and near real-time sensors (See Emmons, D. H. et al., 1999, "Onsite, Near-Real-Time Monitoring of Scale Deposition," Paper SPE 56776 presented at the SPE Annual Technical Conference and Exhibition, New Orleans, Houston, 3-6 October, incorporated herein by reference in its entirety).

The cost of intervention and the cost of production loss during periodic reservoir measurements can be extremely high. Simple intervention in a single well can be as high as $2 million and more than $5 million for wireline logging in subsea wells of water depth in excess of 1500 m (See Al-Asimi, M., Butler G., Brown, G. et al., 2002/2003, "Advances in Well and Reservoir Surveillance," Oilfield Review, winter, pp. 14-35, incorporated herein by reference in its entirety). In recent times, permanent monitoring sensors are installed down hole near sandface during well completion for constant reservoir surveillance of reservoir fluid. Data can be delivered continuously or on demand thereby avoiding intervention cost. Data acquisition frequency can be as high as a fraction of a second and at every meter. Examples of data measured include pressure, temperature, flow rate, fluid phase, and resistivity. Also permanent sensors have been used to monitor working environment of downhole pumps such as motor temperature, vibration, and current leakage. Constant reservoir and well surveillance can help detect potential problems, predict future reservoir and well performance, and also in timely decisions and corrective actions such as adjusting production parameters and scheduling workover operations. Many decades of experience with downhole sensors have brought about innovative methods and technologies that ensure effective data transmission and handling, and longer sensor life. One service company recorded 75 years of continuous measurement of permanent downhole sensors with only one recorded failure. Furthermore, combined tech based reservoir monitoring techniques such as combined resistivity and time lapse (4D) seismic have been utilized to observe changes in reservoirs around injection and production wells which is helpful in detecting and mitigating potential production problems.

The use of temperature logs for monitoring fluid entry or production from oil and gas wells is an old practice. As fluid is injected or produced from a well, the temperature profile changes from the geothermal gradient. Cooling effects (Joule Thomson effect) occurs due to formation gas expansion as they enter the well-bore from the reservoir while warming effects occur during oil and water entry into wells. Temperature log is therefore used to detect location and time of premature fluid entry, early water breakthrough, leakages in well completion, and other production problems. In artificial lift operations, downhole pump environments (temperature, vibration and current leakages) are continuously monitored and adjusted for optimal performance. Pump optimization will ensure longer pump life, reduced intervention and pump replacement cost. Improved practice involves advanced technologies that allow safe deployment and efficient transmission of quality data such that small changes in temperature can be accounted for. Advanced use of temperature logs for well surveillance is reported in a field in Oman, where a distributed temperature system (DTS) is installed downhole to transmit temperature profiles of the production interval of a horizontal well. An important feature of this log is the sensitivity to small temperature change lower than ±0.4° C. A DTS temperature resolution of 0.001° C. has been reported in the literature (See Suárez, F., Aravena, J. E., Hausner, M. B., Childress, A. E., Tyler, S. W., 2011, "Assessment of a vertical high-resolution distributed-temperature-sensing system in a shallow thermohaline environment", Hydrol. Earth Syst. Sci. 15 (3), pp. 1081-1093, incorporated herein by reference in their entirety).

Resistivity logs have also been used in the horizontal sections of a well in another field (Lamott field in Indiana, USA) to monitor fluid movement in a reservoir. In this case, centralizers spaced 20 ft apart were used as the electrodes. Current was applied at one end of the electrode and received at the surface. The voltage drop across each electrode divided by the current through it is a measure of the formation resistance at the corresponding electrode location. The resistivity array identified water migration due to production from a particular zone. Resistivity changes lower than 0.05 ohm-meters were captured by the sensors and provided meaningful information about reservoir fluid migration.

Electrical resistivity of rocks depends on: water saturation; type of ions and ionic strength; temperature; and cation exchange capacity. As a result, high resolution electrical resistance tomography has been successfully used to monitor subsurface migration of various fluids and contaminants, leakage detection, and monitoring of cap rock integrity (See Ramirez, A., Daily, W., Binley, A., LaBrecque, D., and Roelant, D., 1996, "Detection of leaks in underground storage tanks using electrical resistance methods," Journal of Environmental and Engineering Geophysics, 1 (3), pp. 189-203; See Daily, W., and Ramirez, A., 2000, "Electrical imaging of engineered hydraulic barriers," Geophysics, 65 (1), pp. 83-94; and See Newmark, R. L., Daily, W., and Ramirez, A., 2000, "Electrical Imaging EOR stimulation using steel-cased boreholes," Paper SPE 62567 presented at the SPE/AAPG Western Regional Meeting, Long Beach, Calif. June 19-23 (references), each incorporated herein by reference in their entirety). During $CO_2$ sequestration, current industry practice is to log resistivity as a function of depth in many observation wells drilled around an injection well and in strategic locations across the reservoir. The objectives of such logs include: evaluation of reservoir performance, detection of leaks and flow path, and understanding geophysical and geochemical interaction of $CO_2$ with rock and rock fluids.

Other previous works have focused on the applicability of electrical resistivity measurements to track carbon dioxide ($CO_2$) migration by way of resistivity change as a function of $CO_2$ saturation changes during $CO_2$ sequestration. Others have also studied the effect of $CO_2$ injection on the petrophysical and electrical properties of rocks using a continual flow of fluid in and out of the sample, with such flow experiments lasting for few hours or less (See Ramirez, A. L., Newmark, R. L., and Daily, W. D., 2003, "Monitoring Carbon dioxide Floods using Electrical Resistance Tomography ERT: Sensitivity Studies," Journal of Environmental and Engineering Geophysics, 8, pp. 187-208; See Seo, J. G. and Mamora, D. D., 2005, "Experimental and Simulation Studies of Sequestration of Supercritical Carbon Dioxide in Depleted Gas Reservoirs," Journal of Energy Resources Technology 127(1), pp. 1-6; See Christensen, N. B., Sherlock, D., and Dodds, K., 2006, "Monitoring $CO_2$ Injection with Cross hole Electrical Resistivity Tomography," Exploration Geophysics, 37, pp. 44-49; See Nogueira, M. and Mamora, D. D., 2008, "Effect of Flue-Gas Impurities on the Process of Injection and Storage of $CO_2$ in Depleted Gas Reservoirs," Journal of Energy Resources Technology, 130 (1), 013301-013301: DOI:10.1115/1.2825174; See Nakatsuka, Y., Xue, Z., Garcia, H., et al., 2010, "Experimental study on $CO_2$ monitoring and quantification of stored $CO_2$ in saline formations using resistivity measurements," International Journal of Greenhouse Gas Control, 4, pp. 209-216; See Wang, S., and Jaffe, P. R., 2004, "Dissolution of a mineral phase in potable aquifers due to $CO_2$ releases from deep formations; effect of dissolution kinetics," Energy Conversion and Management, 45, pp. 2833-2848; See Mohamed, I. M., He, J., et al., 2012, "Experimental Analysis of $CO_2$ Injection on Permeability of Vuggy Carbonate Aquifers," Journal of Energy Resources Technology 135(1): 013301-013301; and See Nguyen, P., H. Fadaei, et al., 2013, "Microfluidics Underground: A Micro-Core Method for Pore Scale Analysis of Supercritical $CO_2$ Reactive Transport in Saline Aquifers," Journal of Fluids Engineering, 135(2), 021203-021203, each incorporated herein by reference in their entirety). These studies did not consider what happens with formation resistivity after a longer experimental period.

In view of the forgoing, the objective of the present disclosure is to provide a well-bore monitoring process involving logging the temperature and resistivity of a soil, rock, and brine mixture in a carbonate rock formation continuously to identify the formation of scale.

BRIEF SUMMARY OF THE INVENTION

According to a first aspect, the present disclosure relates to a well-bore monitoring process involving i) logging the temperature of a soil, rock, and brine mixture present in a carbonate formation continuously ii) simultaneously logging the resistivity of the soil, rock, and brine mixture in the carbonate formation continuously and iii) interpreting the logged temperature and the logged resistivity to identify dissolution of rock into the mixture and precipitation of scale from the mixture by concurrent events in the logged temperature and the logged resistivity, wherein the simultaneous logging of the temperature and the resistivity is conducted in a well-bore in the carbonate formation.

In one embodiment, the temperature is logged with a thermocouple.

In one embodiment, the resistivity is logged with a LCR meter.

In one embodiment, the temperature and resistivity are logged continuously.

In one embodiment, the concurrent events comprise a simultaneous increase or decrease in the logged temperature and resistivity with respect to baseline values.

In one embodiment, the concurrent events comprise a % deviation of greater than or equal to 5% with respect to a baseline value in resistivity and a % deviation of greater than or equal to 1% with respect to a baseline value of temperature.

In one embodiment, the well-bore is in at least one carbon sink selected from the group consisting of an oilfield, a saline aquifer, an ocean water reservoir, and a landfill.

In one embodiment, the carbonate formation is limestone.

In one embodiment, the simultaneous logging is performed in the limestone, and not in a formation fluid in the well-bore.

In one embodiment, the well-bore monitoring process further includes logging the pH of the soil, rock and brine mixture in the well-bore with a pH meter continuously, wherein the combined logging of temperature, resistivity, and the pH is conducted downhole in the well-bore for detecting the dissolution of rock into the mixture and precipitation of scale from the mixture by concurrent events in the logged temperature, the logged resistivity, and the logged pH of the mixture.

In one embodiment, the well-bore monitoring process also includes monitoring at least one additional parameter selected from the group consisting of pressure changes and salinity content.

In one embodiment, the salinity content is monitored with an inductively coupled plasma-atomic emission spectrometer.

In one embodiment, the well-bore monitoring process additionally involves injecting an antiscalant into the well-bore based on the interpreted temperature and resistivity logs.

In one embodiment, the antiscalant is EDTA.

According to a second aspect, the present invention relates to an automated well-bore monitoring and scale inhibition process involving i) logging the temperature of a soil, rock, and brine mixture present in a carbonate formation continuously ii) simultaneously logging the resistivity of the soil, rock, and brine mixture in the carbonate formation continuously iii) interpreting the logged temperature and the logged resistivity to identify dissolution of rock into the mixture and precipitation of scale from the mixture by concurrent events in the logged temperature and the logged resistivity iv) injecting an antiscalant into the well-bore based on the interpreted temperature and resistivity logs, wherein the simultaneous logging of the temperature and the resistivity is conducted in a well-bore in the carbonate formation, and a computer automates the injecting based on the interpreted concurrent events in logged temperature and logged resistivity.

In one embodiment, the concurrent events comprise a % deviation of greater than or equal to 5% with respect to a baseline value in resistivity and a % deviation of greater than 1% with respect to a baseline value of temperature.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
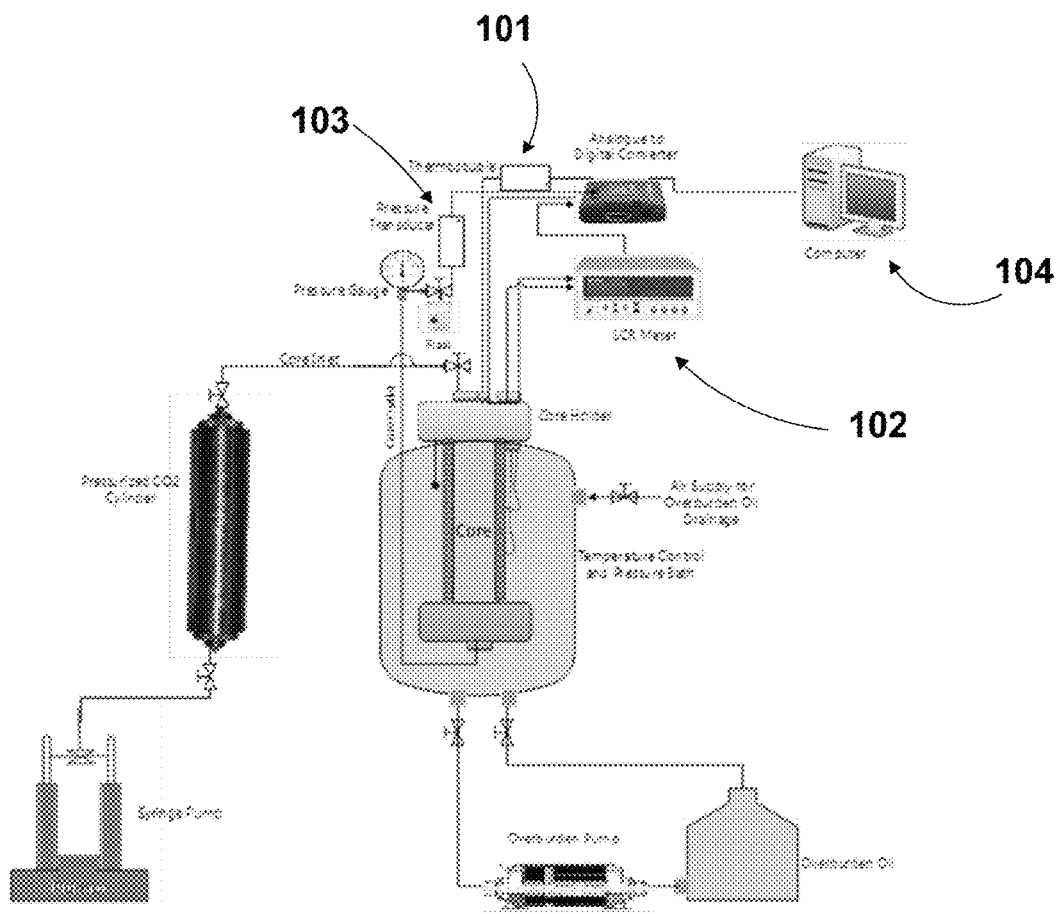
FIG. 1 is an illustration of the experimental setup for $CO_2$ storage, resistivity and temperature measurements.

Embodiments of the present disclosure will now be described more fully hereinafter with reference to the accompanying drawings, in which some, but not all embodiments of the disclosure are shown.

Geologic $CO_2$ sequestration is a process of placing $CO_2$, captured from anthropogenic sources, into long-term storage in geologic zones deep underground to lessen the greenhouse gas effect caused by $CO_2$. Injecting and storing $CO_2$ gas is performed using injection wells within carbonate rock formations. The injection process needs to be monitored to avoid injectivity problems such as scale formation. Also the geochemical behavior of the injected $CO_2$ with the rock and rock fluids must be monitored for prolonged periods of time using observation wells drilled across the length and breadth of the geological formation.

According to a first aspect, the present disclosure relates to a well-bore monitoring process involving logging the temperature of a soil, rock, and brine mixture present in a carbonate formation continuously.

In the present disclosure, "CBRI" or $CO_2$/brine/rock interaction refers to the interaction and chemical reactions that take place between brine and rock and carbon dioxide upon injection of carbon dioxide into a carbonate formation.

A "carbonate formation" or a "carbonate rock formation" as used herein refers to a class of sedimentary rocks composed primarily of carbonate minerals. The two major types of carbonate formations are limestone, which is composed of calcite or aragonite (different crystal forms of $CaCO_3$) and dolomite. Sedimentary rocks are a type of rock formed by the deposition of material at the Earth's surface and within bodies of water. In one embodiment, the carbonate formation is limestone. In one embodiment, the well-bore is in at least one carbon sink selected from the group consisting of an oilfield, a saline aquifer, an ocean water reservoir, and a landfill. In one embodiment, the wellbore is drilled through a rock formation with closed boundary condition.

"Logging" or "log" refers to recording data over time or in relation to location with a built-in or an external instrument or sensor. Logging provides real-time measurements of a single parameter or of various parameters such as temperature, resistivity, pressure, etc. Logging in the present disclosure, unless stated otherwise, is conducted in a well-bore in the carbonate formation (i.e. in the rock) rather than measurements of a fluid or solution within a well-bore.

The temperature of a carbonate formation is logged with a temperature sensor. A temperature sensor of the present disclosure may be a thermistor, a thermocouple, a resistance thermometer, or a silicon bandgap temperature sensor. In one embodiment, the temperature is logged with a thermocouple 101. A thermocouple is a temperature measuring device consisting of two dissimilar conductors that contact each other at one or more spots, where a temperature differential is experienced by the different conductors (or semiconductors). It produces a voltage when the temperature of one of the spots differs from the reference temperature at other parts of the circuit.

The present disclosure relates to a well-bore monitoring process also involving simultaneously logging the resistivity of the soil, rock, and brine mixture in the carbonate formation continuously. In one embodiment, the resistivity is measured with an ohmmeter sensor, such as an LCR meter 102. In one embodiment, the simultaneous logging is performed in the limestone around the well-bore (for example by contacting a sensor with the face of the well bore or inserting a sensor into the formation), and not in a formation fluid in the well-bore.

In one embodiment, a plurality of temperature sensors, and a plurality of resistivity sensors are used to simultaneously log the temperature and resistance of a carbonate formation. The plurality of sensors may be placed at a variety of vertically and horizontally separated levels around a well-bore. Sensors placed at varying depths may provide additional logging information than sensors at a single depth. Further the plurality of sensors may be permanently placed within the carbonate formation in a well-bore. In one embodiment, the various sensors mentioned herein for use in data logging are in contact with the carbonate rock for taking measurements. It is advantageous that the sensors of the present disclosure function through direct contact with the carbonate rock formation, as opposed to a fluid within the well-bore. Measuring various parameters through direct contact with the rock provides information about the dissolution of rock that is inevitable before the precipitation of scale.

The present disclosure also relates to a well-bore monitoring process involving interpreting the logged temperature and the logged resistivity to identify dissolution of rock into the mixture and precipitation of scale from the mixture by concurrent events in the logged temperature and the logged resistivity.

In one embodiment, the well-bore monitoring process further includes logging the pH of the soil, rock and brine mixture in the well-bore with a pH meter continuously, wherein the combined logging of temperature, resistivity, and the pH is conducted downhole in the well-bore for detecting the dissolution of rock into the mixture and precipitation of scale from the mixture by concurrent events in the logged temperature, the logged resistivity, and the logged pH of the mixture.

The term "baseline" as used herein refers to a measured parameter (e.g. temperature, pH, pressure, etc.) of the carbonate formation prior to or after $CO_2$ sequestration, but prior to dissolution of carbonate formation in a closed system (i.e. closed boundary condition). Therefore, the term baseline refers to a "normal" average temperature, resistivity, pressure, pH, of the carbonate rock before or just after $CO_2$ is added to the formation but prior to rock dissolution.

"Concurrent events" as used herein, refers to a simultaneous increase or decrease in the logged temperature, resistivity, and pH with respect to baseline values at a substantially similar time frame during the logging. A concurrent event in the logged data that results in a decrease in temperature, resistivity, and pH relates to dissolution of carbonate rock. A concurrent event in the logged data that results in an increase in resistivity and pH relates to precipitation of scale. A baseline resistivity of a carbonate formation within a reservoir may be 1-8, preferably 2-7, more preferably 3-6 ohms. A baseline pressure of a carbonate formation within a reservoir may be 280-2500, preferably 500-2200, more preferably 1000-2000 psig. In one embodiment, the concurrent events are at exactly the same time. In one embodiment, the concurrent events are at a substantially similar time frame. "Substantially similar time frame", as used herein, refers to an increase or decrease in a logged parameter (e.g. temperature) that occurs at a time that differs by no more than 1 hour, no more than 50 minutes, no more than 40 minutes, no more than 30 minutes, no more than 20 minutes, no more than 10 minutes, no more than 5 minutes, no more than 1 minute, no more than 30 seconds, relative to an increase or decrease of another logged parameter (e.g. pH, resistivity, etc.).

In one embodiment, the concurrent events comprise a % deviation of greater than or equal to 5%, greater than or equal to 6%, or greater than or equal to 7% with respect to a baseline value in resistivity, and a % deviation of greater than or equal to 1%, greater than or equal to 2%, greater than or equal to 3% with respect to a baseline value of temperature. Therefore, a concurrent event in the logged data that results in a decrease in temperature, resistivity, and pH with a % deviation from baseline as defined above, relates to the dissolution of carbonate rock in the carbonate formation. A concurrent event in the logged data that results in an increase in resistivity and pH with a % deviation from baseline as defined above, relates to precipitation of scale.

The term "continuously" refers to both the uninterrupted logging of data over a period of time and the logging of data in repeating intervals over a period of time. For instance, data may be logged continuously in repeating intervals that involve capturing and recording a parameter (temperature, pressure, etc.) every 0.5 seconds, every 1 second, every 2 seconds, every 5 seconds, every 10 seconds, every 30 seconds, every minute, every 5 minutes, every 10 minutes, every 30 minutes, every hour, every 2 hours, every 10 hours, every day, every 2 days, every 3 days, every 4 days, every week, with a repeating interval for a particular amount of time. In one embodiment, the parameters such as temperature and resistivity are logged continuously for a period of time that is at least 30 days, at least 40 days, at least 50 days, at least 60 days, at least 70 days, at least 100 days, at least 200 days, at least 1 year, at least 2 years, at least 5 years, at least 10 years.

In one embodiment, the well-bore monitoring process also includes monitoring at least one additional parameter selected from the group consisting of pressure changes, salinity content, and flow rate changes. In one embodiment, a pressure transducer 103 is used to log changes in pressure over a period of time. Various pressure transducers are suitable for use in the present disclosure, including, but not limited to an absolute pressure sensor, a gauge pressure sensor, a vacuum pressure sensor, a differential pressure sensor, and a sealed pressure sensor. A concurrent event in the logged data that results in a pressure drop from a baseline pressure relates to the precipitation of scale. In one embodiment, the salinity content is monitored with an inductively coupled plasma-atomic emission spectrometer.

Most water sources, especially saline containing water sources contain a variety of calcium-based salts, such as calcium carbonate and calcium bicarbonate. Once the solubility limit of these calcium-based salts is reached, the salts precipitate out of solution to form solids referred to as scale. The resulting scale or incrustation can build up on sequestration equipment, and cause technical problems and eventual equipment shutdown. In terms of the present invention, the term "scale" refers to calcium scale, and more specifically $CaCO_3$. However, other types of scale include calcium sulfate, barium sulfate, strontium sulfate, calcium phosphate, calcium fluoride, calcium silicate, magnesium hydroxide, zinc carbonate, and the like.

The term "precipitation" or "precipitate" as used herein, refers to any sparingly soluble rock grain (e.g. salt), as defined hereinabove, which has become insoluble and has precipitated out of the solution. The term may be used, and have substantially the same meaning as the term "deposit" or "scale" or "lime". The term "Precipitation" is also referred to as "mineralization" in the context of $CO_2$ sequestration.

In one embodiment, the well-bore monitoring process additionally involves injecting an antiscalant into the well-bore based on the interpreted temperature and resistivity logs.

The term "antiscalant" or "scale inhibitor" refers to any chemical agent that prevents, slows, minimizes, or stops the precipitation of scale from solution. Calcium-based scale inhibitors which may be injected into the well-bore in the present disclosure include, phosphine or sodium hexametaphosphate, sodium tripolyphosphate and other inorganic polyphosphates, hydroxy ethylidene diphosphonic acid, butane-tricarboxylic acid, phosphonates, or phosphonic acids such as tris(methylenephosphonic acid), etc. carboxyl group-containing starting material acids, maleic acid, acrylic acid and itaconic acid and the like, polycarboxylic acid polymers, sulfonated polymers, vinyl sulfonic acid, allyl sulfonic acid, and 3-allyloxy-2-hydroxy-propionic acid and other vinyl monomers having a sulfonic acid group, or a non-ionic acrylamide monomer from the vinyl copolymer, and the like. In one embodiment, the antiscalant is injected into the well-bore such that the well-bore fluid contains at least 0.5% antiscalant, at least 1% antiscalant, at least 2% antiscalant, at least 3% antiscalant, at least 4% antiscalant, at least 5% antiscalant. The antiscalant may be injected into the well-bore until the logged temperature, resistivity, and pH parameters return to baseline levels, indicating that sufficient quantities of antiscalant has been added to prevent the formation of scale.

In one embodiment, the antiscalant is EDTA.

In the present disclosure, the concurrent events in the logged parameters (temperature, resistivity, etc.), with a % deviation from baseline values as defined previously, indicate events within the $CO_2$ sequestration well relating to carbonate rock dissolution or scale precipitation. It is therefore envisioned that the concurrent events in the logged data provides an indicator for when an intervening action may be used to prevent either the dissolution of carbonate rocks, or the precipitation of scale. In one embodiment, the intervening action is to slow or stop the injection of $CO_2$ into the well until the logged temperature, resistivity, pH, pressure, etc. return to baseline values. In one embodiment, the intervening action is to inject an antiscalant into the well-bore until the logged temperature, resistivity, pH, pressure, etc. return to baseline values. For example, a concurrent event resulting in a decrease in temperature, resistivity, and pH with a % deviation from baseline as defined above, indicates that dissolution of rock is occurring or imminent, and in response, the injection of $CO_2$ into the well may be slowed or stopped until baseline values are again obtained. Further, a concurrent event resulting in an increase in resistivity and pH with a % deviation from baseline as defined above, indicates the precipitation of scale is occurring or imminent, and in response, an antiscalant may be injected into the well-bore until baseline values are again obtained.

In an alternative embodiment, temperature, pressure, resistivity, and pH sensors or meters can be placed into a formation fluid within the well-bore, and the parameters can be logged by measuring changes within the fluid as opposed to measuring changes within the rock. In this case, the process of the present disclosure may be expanded to logging measurements of pipelines, tanks, and surface facilities relating to well-bore equipment or the fluid in the well-bore itself. Further, it is envisaged that the present process can be adapted to monitor various parameters within the carbonate rock and the well-bore fluid concurrently by placing separate sensors in both the rock and the drill fluid.

According to a second aspect, the present invention relates to an automated well-bore monitoring and scale inhibition process involving i) logging the temperature of a soil, rock, and brine mixture present in a carbonate formation continuously ii) simultaneously logging the resistivity of the soil, rock, and brine mixture in the carbonate formation continuously iii) interpreting the logged temperature and the logged resistivity to identify dissolution of rock into the mixture and precipitation of scale from the mixture by concurrent events in the logged temperature and the logged resistivity iv) injecting an antiscalant into the well-bore based on the interpreted temperature and resistivity logs, wherein the simultaneous logging of the temperature and the resistivity is conducted in a well-bore in the carbonate formation, and a computer 104 automates the injecting based on the interpreted concurrent events in logged temperature and logged resistivity.

Analogous to a non-automated process, the automated process may log temperature, resistivity, and additional parameters (pH, pressure, etc.) by collecting measurements within the carbonate formation. These measurements may be taken continuously, and the interpretation of concurrent events is as described previously. The only difference is that the interpretation may be automated by a computer.

In one embodiment, the concurrent events comprise a % deviation of greater than or equal to 5% with respect to a baseline value in resistivity and a % deviation of greater than 1% with respect to a baseline value of temperature. Analogous to a non-automated process, concurrent events in an automated process provides an indicator for when an intervening action may be used to prevent either the dissolution of carbonate rocks, or the precipitation of scale. The intervening action may involve slowing or stopping the injection of $CO_2$ into the well, and this intervening action may be automated in response to concurrent decreases in the logged temperature, resistivity, and pH parameters. Further, the computer may automate the injection of an antiscalant into a well-bore based on the computer interpreted concurrent increases of the various logged parameters.

Figure 10:
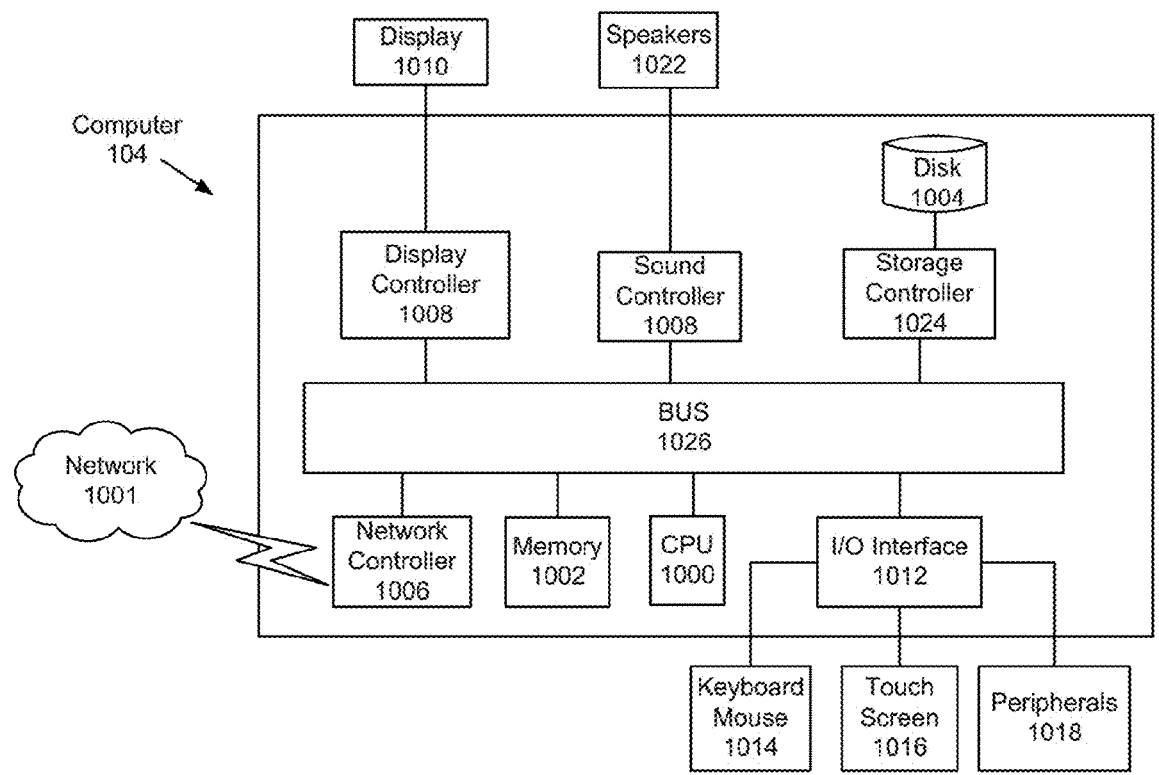
FIG. 10 is an illustration of a computer design and components.

Next, a hardware description of the computer 104 according to exemplary embodiments is described with reference to FIG. 10. In FIG. 10, the computer includes a CPU 1000 which performs the processes described above/below. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art.

The hardware elements in order to achieve the computer may be realized by various circuitry elements, known to those skilled in the art. For example, CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The computer in FIG. 10 also includes a network controller 1006, such as an Intel Ethernet PRO network interface card from Intel Corporation of America, for interfacing with network 1001. As can be appreciated, the network 1001 can be a public network, such as the Internet, or a private network such as an LAN or WAN network, or any combination thereof and can also include PSTN or ISDN sub-networks. The network 1001 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computer, such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computer. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Example 1

Experimental Setup

Carbonate rock samples were collected from the same rock quarry of Indiana limestone with recorded high level of homogeneity, which is important so as to be able to compare results between samples. Furthermore, Mercury injection capillary pressure (MICP) and NMR analysis in addition to porosity measurements were used to ascertain homogeneity.

Samples were cut into cylindrical cores and their ends surface grinded to achieve very flat faces necessary for good electrical contact. They were then cleaned with methanol in a soxhlet apparatus to remove all salt deposits from their pores. They were then dried in a vacuum oven after which sample dimensions and properties were measured (Table 1). Synthetic brine with composition and properties in Table 2 was prepared and used to saturate core samples.

TABLE 1

| | | Core properties | | | |
|---|---|---|---|---|---|
| Sample ID | L (cm) | D (cm) | Bulk Vol. (cc) | He Porosity (%) | Air permeability K |
| IL-1 | 7.064 | 3.736 | 77.43 | 17.790 | 423 |
| IL-2 | 7.034 | 3.741 | 77.37 | 18.367 | 324 |
| IL-3 | 6.815 | 3.737 | 74.76 | 19.458 | 536 |
| IL-4 | 6.603 | 3.735 | 72.35 | 19.354 | 652 |

TABLE 2

| Synthetic formation brine composition and properties | |
|---|---|
| Composition | Weight (g/l) |
| Sodium Chloride (NaCl) | 44.5 |
| Calcium Chloride (CaCl$_2 \cdot$2H$_2$O) | 9.65 |
| Magnesium Chloride (MgCl$_2 \cdot$6H$_2$O) | 3.41 |
| Sodium Bicarbonate (NaHCO$_3$) | 0.15 |
| Sodium phosphate (Na$_2$SO$_4$) | 0.28 |
| TDS (g/l) | 57.99 |
| Density (g/cc) | 1.02 |
| Resistivity @ 22.5° C. (ohm-m) | 0.401 |

Figure 2:
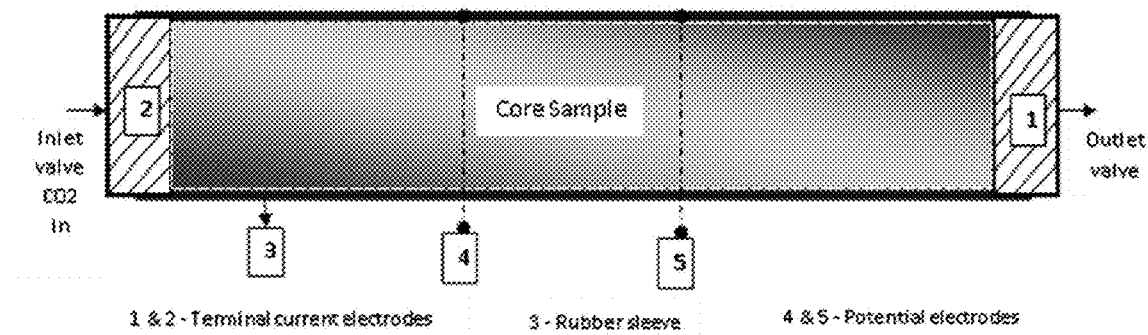
FIG. 2 is an illustration of the core holder assembly.
Figure 3A:
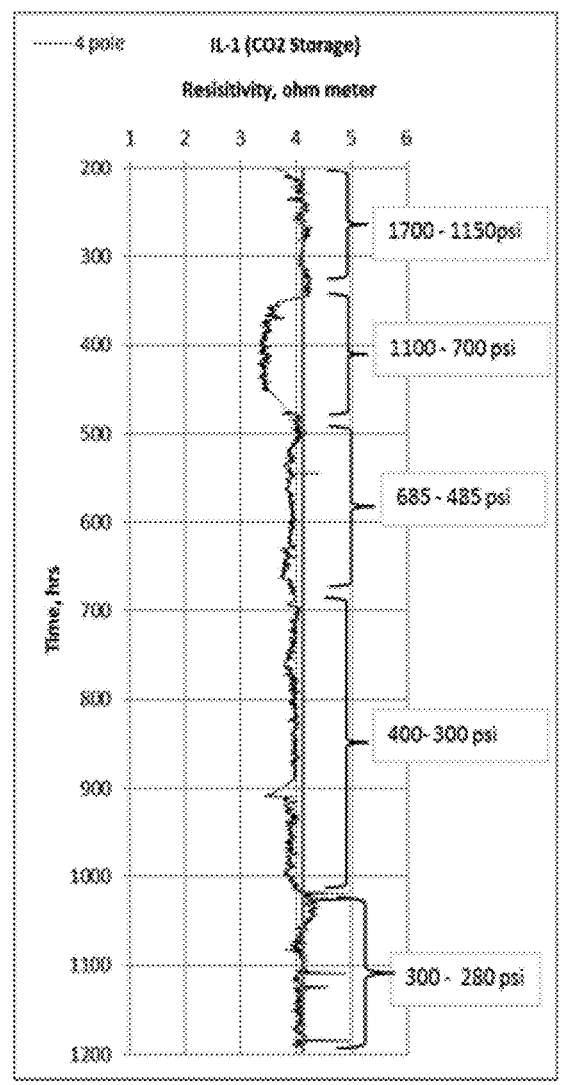
FIG. 3A is a graph of a resistivity log during $CO_2$ storage in a saline aquifer (IL-1).
Figure 3B:
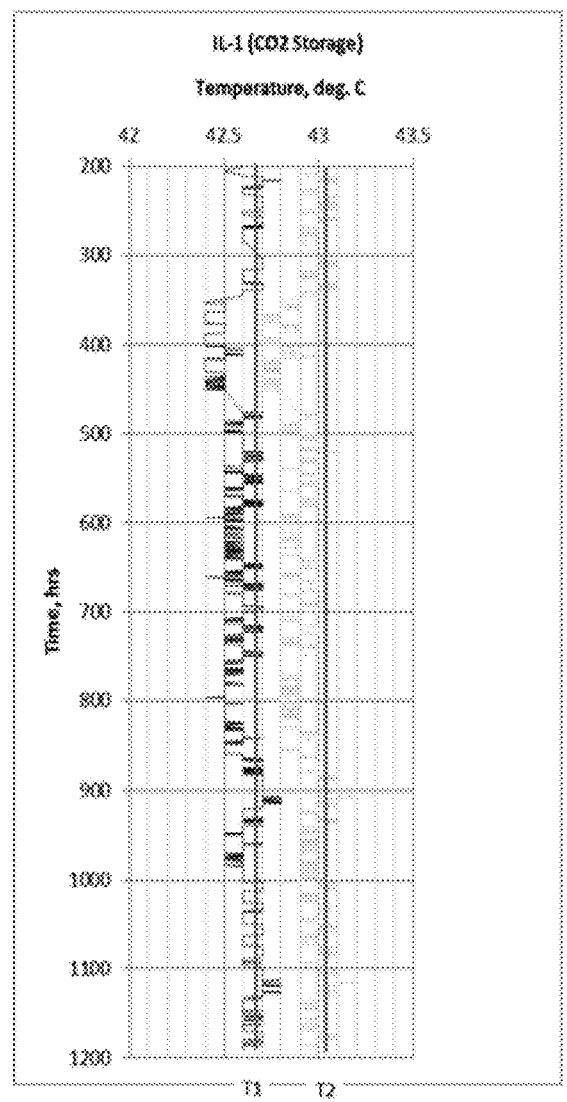
FIG. 3B is a graph of a temperature log during $CO_2$ storage in a saline aquifer (IL-1).
Figure 4A:
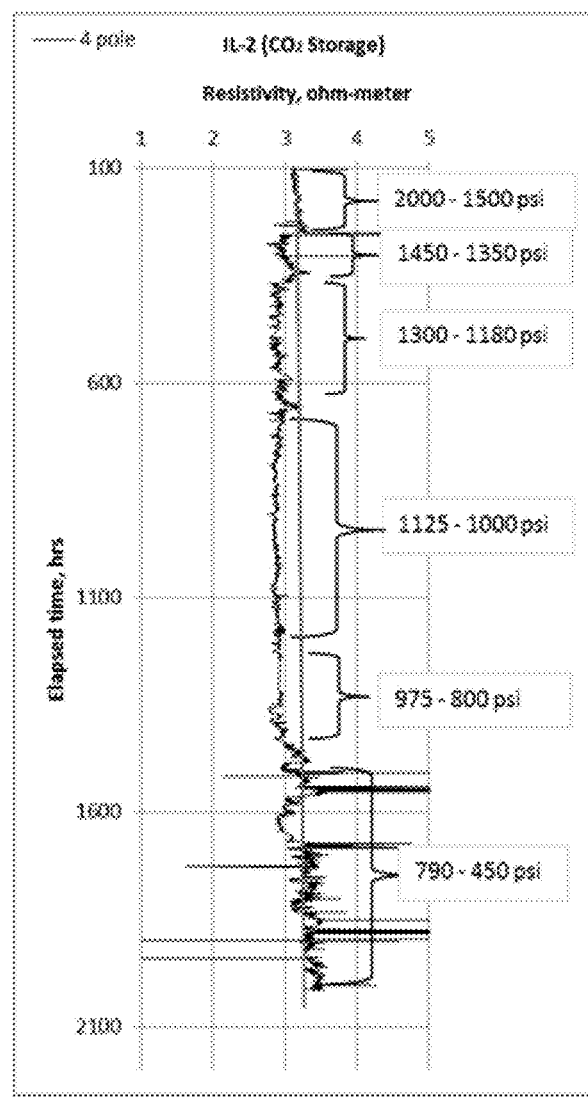
FIG. 4A is a graph of a resistivity log during $CO_2$ storage in a saline aquifer (IL-2).
Figure 4B:
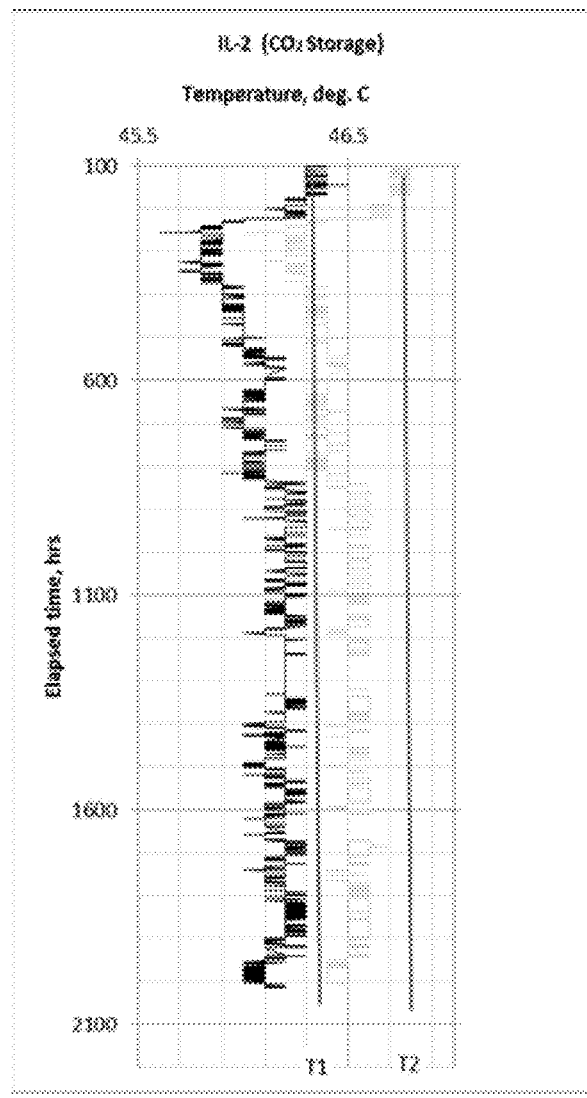
FIG. 4B is a graph of a temperature log during $CO_2$ storage in a saline aquifer (IL-2).

FIG. 1 is the setup for CO$_2$ storage and resistivity measurements. Pure CO$_2$ was injected into brine saturated carbonate core samples at CO$_2$ pressure of 2000 psig under confining pressure and reservoir temperature of 45° C. Prior to loading samples in the temperature control bath (or test cell), each sample was placed in a Viton sleeve embedded with two electric potential electrodes (FIG. 2). Two stainless steel caps at both ends of the core served as the current electrode as well as core inlet and outlet. The core samples were wrapped with Teflon tape such that only part of the samples that are in contact with the potential electrodes are left open. This served to reduce and delay CO$_2$ effusion through the Viton sleeve. A core inlet valve was connected to a CO$_2$ source by steel tubing and fittings. A pressure gauge connected to the CO$_2$ line was used to monitor CO$_2$ pressure during storage. CO$_2$ was injected into the brine saturated sample until pore pressures reached 2000 psig at an overburden pressure of 2500 psig and temperature of 45° C. A pump connected to the test cell delivered the overburden oil from the oil tank to the test cell while a heater wrapped around the cell heated the oil to the desired temperature. Both the core inlet and outlet valves were closed after $CO_2$ injection while a LCR meter connected to the test cells coupled with a data acquisition system and a computer allowed for continuous monitoring of rock resistivity with time as the $CO_2$, brine, and rock interact. $CO_2$ pressure was also monitored and recorded with time. Core temperature was also measured with time using thermocouple installed in the test cell. $CO_2$ was allowed to age in the core samples for a period of between 30 to 60 days. At the end of storage brine samples were collected in a test tube for post storage brine analysis. The core samples were also cleaned and prepared for porosity and permeability measurements. The resolutions of the temperature and resistivity measurements were 0.1° C. and 0.0001 ohm-m respectively.

Example 2

Results and Discussion

Combined logs of resistivity and temperature with time for all samples are shown in FIG. 3-7. It was observed that the resistivity and temperature logs remain fairly constant after $CO_2$ injection until after about 150 hours, when the log deflected to the left. The log prior to deflection was then taken as the baseline log for all the $CO_2$ storage experiments. FIGS. 3A and 3B and FIGS. 4A and 4B show the combined resistivity and temperature logs for $CO_2$ storage in sample IL-1 and IL-2 respectively. The two logs (resistivity and temperature) showed similar trends in both samples tested. Electrical resistivity signature was constant prior to $CO_2$ injection and later increased in response to $CO_2$ influx and remained constant again around this resistivity value until after quite a number of days (4-6 days in both experiments) when the constant resistivity pattern deflected from the baseline to the left suggesting the onset of chemical reactions between the three phases—$CO_2$, brine, and carbonate grains. The resistivity returned back to the base line after some days and remained on the base line for quite some time until late storage time when a second deflection, this time to the right, was observed again. Two major deflections were thus visible and a return to the base line after the first deflection observed in the two tests could provide very important information about $CO_2$/brine/rock interaction (CBRI). One distinct deflection was consistent in the temperature log and that is the deflection to the left from the base log at the same time the resistivity log deflected to the left. The temperature log also returned to base log at the same time as the resistivity log. Petrophysical core analysis prior to and after $CO_2$ storage and post brine geochemical analysis (FIG. 8) helped to interpret the observed trends. The analysis confirmed minor grain dissolution and the presence of calcite minerals in brine effluents which is a byproduct of the interaction.

Accurate interpretation of the observed and consistent trends is needed to understand the relationship between CBRI and rock resistivity and temperature. A possible explanation for this observation is that the deflection to the left (reduction) of both resistivity and temperature signifies the dissolution process, which is endothermic, resulting in lower temperature during the dissolution period (FIGS. 3 and 4). The duration of dissolution is controlled by the duration at which $CO_2$ is trapped in the core pore space before being consumed by a dissolution process. Equations 1 to 5 describe the $CO_2$ brine rock interaction processes in a carbonate formation (See Daneshfar, J., Hughes, R. G., et al., 2009, "Feasibility Investigation and Modeling Analysis of $CO_2$ Sequestration in Arbuckle Formation Utilizing Salt Water Disposal Wells," Journal of Energy Resources Technology, 131(2): 023301-023301, incorporated herein by reference in its entirety).

$$CO_2 + H_2O \leftrightarrow H_2CO_3 \tag{1}$$

$$H_2CO_{3(aq)} \leftrightarrow H^+_{(aq)} + HCO_{3(aq)}^- \tag{2}$$

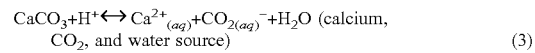

$$CaCO_3 + H^+ \leftrightarrow Ca^{2+}_{(aq)} + CO_{2(aq)}^- + H_2O \text{ (calcium, } CO_2\text{, and water source)} \tag{3}$$

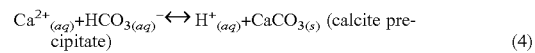

$$Ca^{2+}_{(aq)} + HCO_{3(aq)}^- \leftrightarrow H^+_{(aq)} + CaCO_{3(s)} \text{ (calcite precipitate)} \tag{4}$$

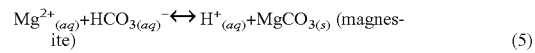

$$Mg^{2+}_{(aq)} + HCO_{3(aq)}^- \leftrightarrow H^+_{(aq)} + MgCO_{3(s)} \text{ (magnesite)} \tag{5}$$

Dissociation of $H_2CO_3$ formed from Eq. (1) will trigger forward reaction and more $CO_2$ is dissolved in brine. Dissociation results in the formation of bicarbonate ions and hydrogen ions (Eq. 2) which further increases the acidity of the brine. Protons ($H^+$) formed after dissociation of bicarbonate will leach out cations from the carbonate rock minerals according to Eq. (3) to produce free Calcium ions in solution. The reaction of bicarbonate ions (produced from Eq. 2) with reactive calcium ions (produced from Eq. 3) leads to the formation of stable minerals (Eq. 4). Equation 4 is the reversible reaction of Eq. (3), which occurs at higher pH brought about by a reduced volume of dissolved $CO_2$ in brine (Eq. 1) or because the rate of ionization of carbonic acid (Eq. 2) does not keep up with the pace of consumption of hydrogen ions—note that Carbonic acid is a weak acid and does not completely ionize. In that case the reversible reaction (Eq. 4) occurs simultaneously with forward reaction until equilibrium. Equilibrium is said to be achieved when both forward and backward reactions (in Eq. 3 or Eq. 4) occur at the same rate or when no reaction occurs. Ionization and leaching of calcium ion from carbonate grain surfaces are all endothermic processes, i.e. heat is taken from the surrounding to break calcium carbonate bonds. This explains the lower temperature observed in the temperature log in all the $CO_2$ storage experiments. It can be seen that at these low temperature periods, the resistivity logs were also seen to deflect to the left (lower resistivity). This means the brine is more conductive during the period due to increase in the population of free ions in the brine that helped to conduct electricity more than before. During the reversible reaction (Eq. 4), the ionic strength is reduced leading to the increase in resistivity seen in the resistivity log. Resistivity continues to decrease until equilibrium state when the resistivity became constant. Later, during storage when $CO_2$ pressure dropped significantly, the pH increased significantly too and this resulted in more precipitation and more ions taken out of solution. The result is a further increase in resistivity seen at the last stage of $CO_2$ storage. In all the $CO_2$ storage experiments, ionization or leaching of carbonate grains started at about 150 hours while precipitation started after pressure dropped below 800 psig.

Figure 5A:
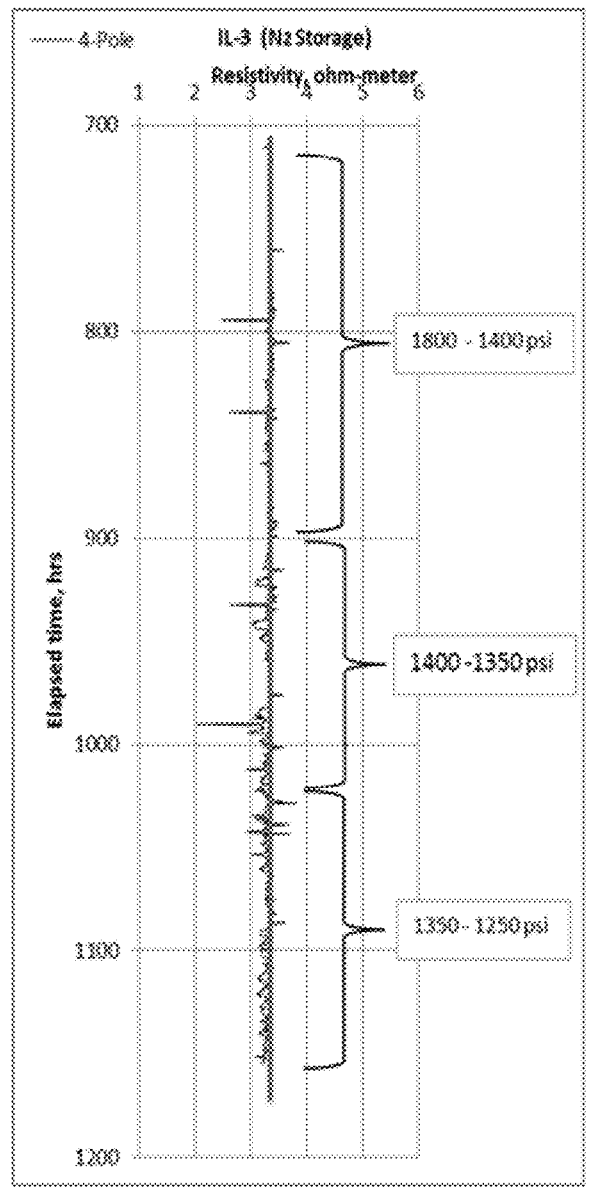
FIG. 5A is a graph of a resistivity log during nitrogen storage in a saline aquifer (IL-3).
Figure 5B:
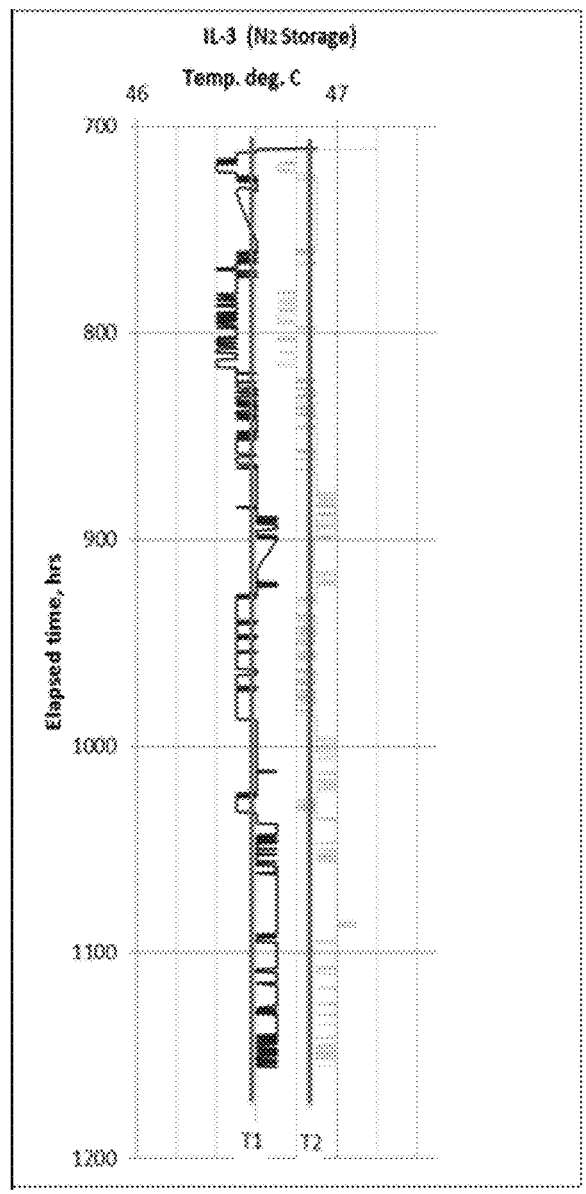
FIG. 5B is a graph of a temperature log during nitrogen storage in a saline aquifer (IL-3).

In order to investigate if the observed trend was as a result of CBRI, pure Nitrogen was stored in another core sample (IL-3) at the same storage condition as $CO_2$. FIG. 5A and FIG. 5B is the resistivity and temperature log of this sample (IL-3). The resistivity and temperature signature was seen to be different from that of $CO_2$ storage. Resistivity and temperature logs were seen to be relatively constant as no major deflection from the base line were seen. This is so because nitrogen is an inert gas which is soluble in water without any further chemical reaction with water or the surrounding carbonate grains.

Figure 6A:
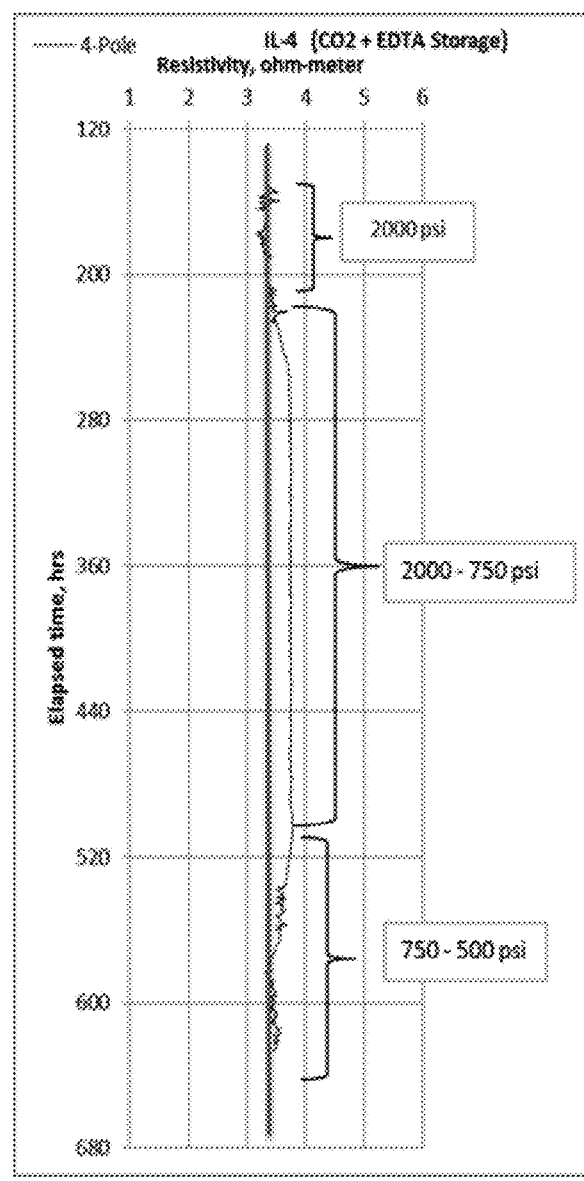
FIG. 6A is a graph of a resistivity log during $CO_2$+EDTA storage in a saline aquifer (IL-4).
Figure 6B:
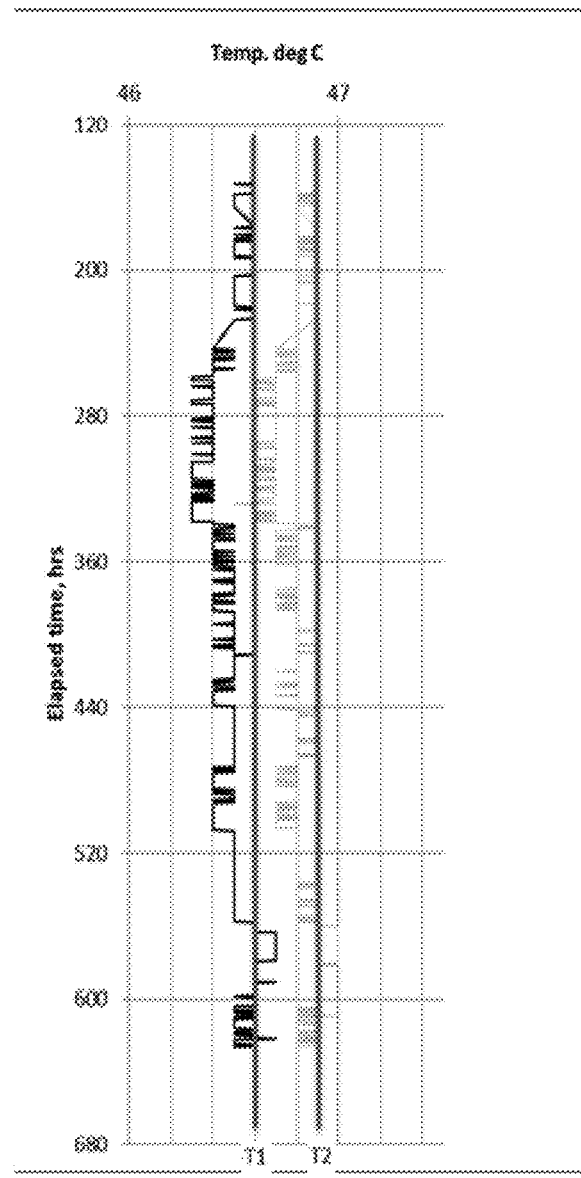
FIG. 6B is a graph of a temperature log during $CO_2$+EDTA storage in a saline aquifer (IL-4).

FIG. 6A and FIG. 6B is the log of $CO_2$ storage in a core saturated with brine containing 3% chelating agent (ethylene di-amine tetra-acetic acid, EDTA). EDTA absorbs metal ions such as calcium ions from solution immediately as they are leached out of carbonate grains, and binds them to form stable and unreactive chelate complexes that are non-conductive. At high $CO_2$ pressure when the pH of brine solution is low, leaching began as seen from the temperature log, the resistivity effect was the reverse from previous $CO_2$ storage without a chelating agent. Resistivity logs deflected to the right while the temperature log deflected to the left as before, signifying dissolution of calcium carbonate which is an endothermic process. The higher resistivity or deflection to the right is due to the fact that the chelating agent absorbed the calcium ions as they are produced while hydrogen ion (that contributes to electric current) is continuously depleted during the process at a rate faster than they are produced. It could be seen at this period of chelation that the resistivity log is constant. At low $CO_2$ pressure, the effect of precipitation on resistivity was seen by an increase in resistivity (deflection to the right of the base line) in FIGS. 3 and 4. Such effect could not be seen here as the reactive ions have been long absorbed by the chelating agent right from the start. This is why the increased resistivity effect was not seen at low $CO_2$ pressure but rather a decrease in resistivity. A decrease in resistivity or deflection to the left is believed to be due to the fact that the EDTA saturation point was reached and it could no longer absorb more calcium ions, hence the ions moved freely and conducted current at this stage.

Figure 7A:
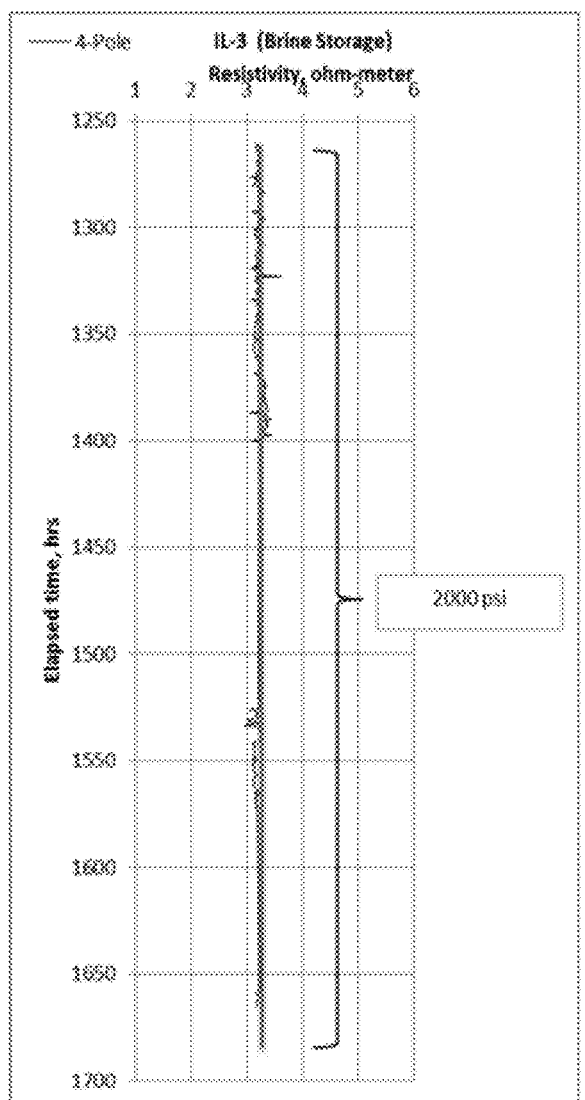
FIG. 7A is a graph of a resistivity log during brine storage in a saline aquifer (IL-3) at 2000 psi.
Figure 7B:
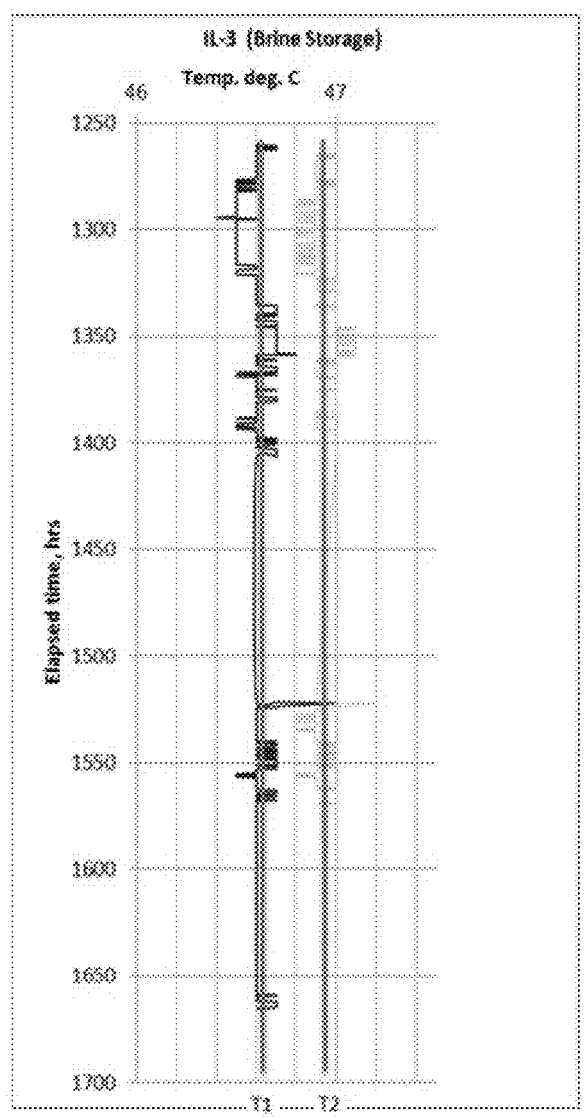
FIG. 7B is a graph of a temperature log during brine storage in a saline aquifer (IL-3) at 200 psi.
Figure 8:
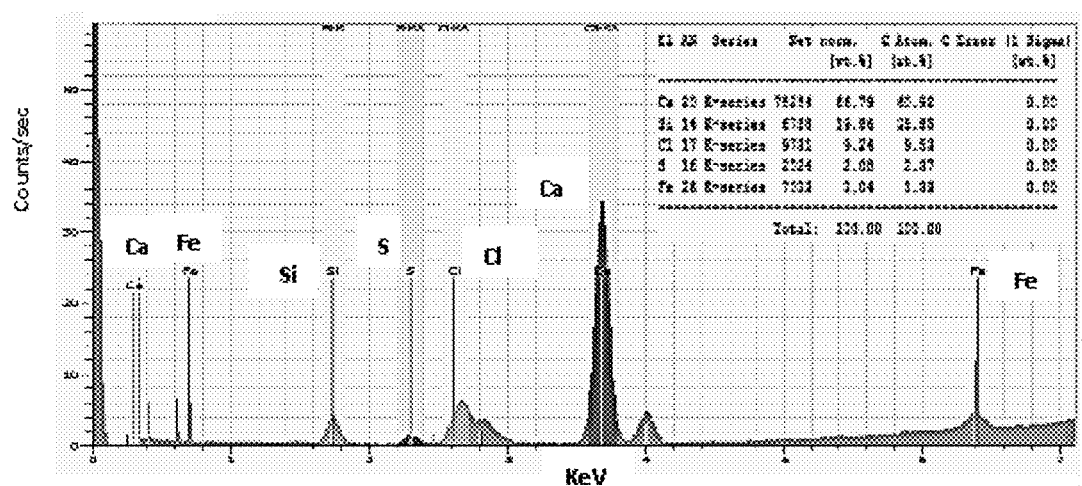
FIG. 8 is an X-ray fluorescence (XRF) analysis on precipitates made of 61% calcium.

In another experiment pure brine was stored in a sample at the same condition of $CO_2$ and $N_2$ storage in order to ascertain that the reason for the observed trends is as a result of the type of stored fluids and their interaction with the rock minerals. FIG. 7A and FIG. 7B shows that resistivity and temperature logs were constant throughout the period of brine storage. This further confirms that the observed deflection pattern in $CO_2$ storage is as a result of CBRI.

Inductively coupled plasma-atomic emission spectrometer (ICP-AES) analysis of brine prior to $CO_2$ storage and post $CO_2$ storage showed a difference in salinity content (see Table 3). Precipitates were also seen at the bottom of brine effluents collected in test tubes. XRF analysis (FIG. 8) on these precipitates confirmed they are calcium carbonates. Core samples were cleaned, dried, and measured for post storage porosity and permeability. Porosity was found to increase in $CO_2$ storage samples (18.4% for IL-1, 19.3% for IL-2) while permeability reduced from 423 mD to 201 mD in sample IL-1 and from 324 mD to 297 mD in sample IL-2. Reduction in permeability is due to blockage of pore throats by precipitates formed after CBRI.

TABLE 3

Brine analysis at pre and post $CO_2$ storage

| | Pre $CO_2$ Storage (mg/l) | Post $CO_2$ Storage (mg/l) | |
| --- | --- | --- | --- |
| | Pure Brine | IL-2 | IL-1 |
| Na | 17462 | 19035 | 19002 |
| Mg | 317 | 351 | 344 |
| Ca | 3570 | 3983 | 3866 |
| Cl | 35879 | 37666 | 37801 |
| $SO_4$ | 365.5 | 290.8 | 318.7 |
| $HCO_3$ | 34.5 | 85.7 | 58.7 |
| $CO_3$ | 4434 | 18669 | 8946 |
| TDS | 62062 | 80080.5 | 70336.4 |

An experimental setup that monitors changes in a fluid environment can be used to further extend the scope of the monitoring process, by incorporating an online pH meter in combination with resistivity and temperature tools such that the resistivity and temperature measurements can be correlated with the fluid's pH values at every data point. This would allow for better interpretation of observed trends. Furthermore, the proposed procedure would allow the previous study to be extended to non-porous media such as pipelines, tanks, and surface facilities.

Figure 9:
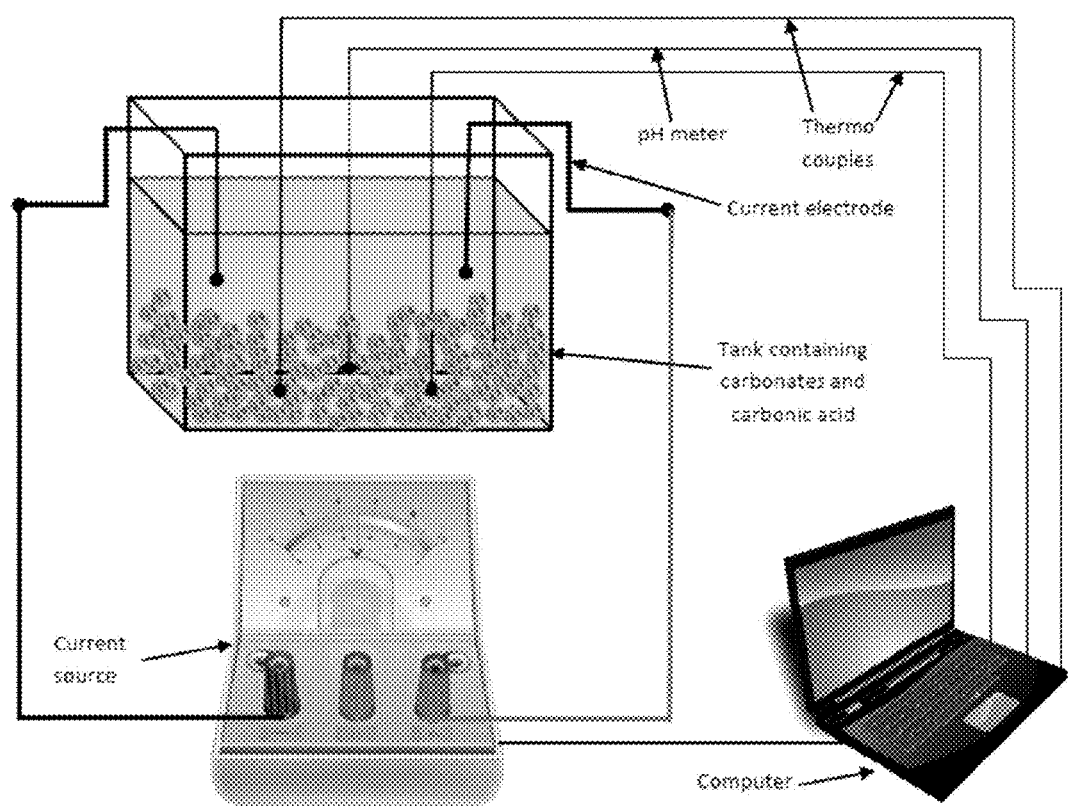
FIG. 9 is an illustration of an experimental design setup for monitoring CBRI and scale formation in storage tank or pipelines.

In the proposed setup (FIG. 9), current is passed through a mixture of brine, $CO_2$, and granulated calcium carbonate (CBR system) at reservoir or atmospheric condition. A current source which also measures electric conductivity transmits current through two electrodes (made of carbon) inserted in the system. A data acquisition system collects conductivity measurements from the current source and transmits them to a computer at a regular interval. Two thermocouples and a pH meter inserted into the $CO_2$-brine-rock system also collect temperature and pH values respectively and transmit them to the computer at the same time conductivity measurements are logged. Alternatively, under atmospheric conditions, brine and supercritical $CO_2$ can be replaced with carbonic acid diluted with brine solution since a mixture of $CO_2$ and brine normally results in the formation of carbonic acid. The CBR system can be left in this state for about 2 months during which resistivity, temperature, and pH values of the system will be continuously logged.

Formation and aquifer water normally contains the following ions: H+, $Ca^{2+}$, $Na^+$, $Mg^{2+}$, Cl—, $HCO^{-3}$, and $SO^2{}_4$. These ions assist in transmitting electric current when electric current is passed through the rock for well logging purpose. The conductivity of the formation increases with the concentration of the ions present and vice versa. During the storage period, a chemical reaction occurs between the system's components, according to the equations 1-5.

Carbonic acid dissociates (Eq. 2) to release hydrogen ions thereby increasing the acidity of the system. The hydrogen ions released from the carbonic acid then leach the calcium ions and other positive ions (such as Ca, Mg, and Fe ions) present in the rock matrix. As the reaction proceeds this way, the amount of ions in solution increases and electrical conductivity increases. Temperature is also expected to decrease during this period since heat was absorbed from the surrounding to break the cations from the rocks. Measurements from the online pH meter is also expected to confirm the interpretation if pH value decreases during the same period. It was then confirmed that this period (deflection to the left) marks the rock dissolution period. Precipitation also occurs (according to Eq. 4 and 5) during this period. The response of the resistivity and temperature logs at a particular time reflect whether dissolution or precipitation is dominant. Often, dissolution is dominant at the early stage when there is enough $CO_2$ pressure and the acidity of the solution is high while precipitation is dominant when acidity falls (high pH value). Precipitation is caused by increased pH which normally occurs when the acid is consumed to dissolve the rock grains (i.e. when the rate of ionization of carbonic acid is slower than the rate of rock dissolution) and/or $CO_2$ concentration/pressure drops. A baseline log for the proposed procedure can be obtained by taking measurements on only carbonic acid diluted with formation brine prior to the introduction of carbonate grains (in the case of using carbonic acid plus brine), or by running the logs on only brine and carbonate grains prior to introduction of $CO_2$.

The procedure can be repeated with the introduction of a chelating agent (such as ethylene di-amine tetra-acetic acid, EDTA) into the solution. The effect of the EDTA would be seen on the resistivity/conductivity log since the chelating agent would immediately absorb the cations leached from the rock and binds them to form stable compounds that do not contribute to current flow. As observed in the previous study, the temperature decreased during the rock dissolution period but resistivity was not seen to decrease because the amount of ions in solution decreased—the hydrogen ions produced by dissociation of carbonic acid was continuously depleted without replacement of calcium ions as used to be the case when chelating agent was not present.

In this procedure, precipitates can be visualized as they are formed. Installation of a constant video camera should be able to capture formation of precipitates and other electrochemical reaction dynamics.

Example 3

Significance and Field Applicability

1. Long term monitoring of geochemical processes during $CO_2$ sequestration in saline aquifers: The disclosure is applicable for monitoring $CO_2$ saturation distribution as well as mineralization of the injected $CO_2$ in deep saline aquifer of carbonate formation type. The geological formation must also be of closed boundary such that water saturation remains constant during and after injection. This is to ensure that resistivity change is not due to change in water saturation from external source but only due to geochemical processes (rock dissolution and precipitation) as observed in the experimental results. $CO_2$ storage by mineralization (also called scaling or precipitation) is the safest and the long term goal of all sequestration projects. Observation wells drilled (or existing wells converted to observation wells) across a geological formation such as a deep saline aquifer for the purpose of sequestering and monitoring CO2 should be equipped with relevant measurement sensors such as resistivity, temperature, pressure gauges, pH and fluid sampling system. The wells should be equipped with data acquisition system for online and in-situ monitoring.
2. Scale monitoring and well intervention during $CO_2$ injection or other: Maximum fluid production and/or injection require(s) effective scale management. Effective scale management involves reduction and monitoring of scale formation. Currently scale inhibitors are injected to minimize scale formation while monitoring techniques used to evaluate rate of scale deposition rely on produced fluids to the surface. There is no reliable online monitoring technique available for monitoring the extent of scale formation. This method can detect in real-time the dissolution of carbonates and scale formation at reservoir conditions. Online monitoring techniques herein can be used to test the performance of injected scale inhibitors. Trends obtained will inform operators of eminent scale problems and thus allow them to take rapid corrective measures which reduce costs of scale related system failures. The process herein does not require a new installation but uses already installed downhole sensors without the need for additional supporting equipment. Since temperature and resistivity sensors are normally installed in many locations down hole (laterally and vertically), scale formation at its earliest stage can now be monitored in situ and in real-time across the reservoir by using sensors in the rock formations. Resistivity and temperature logging must therefore start early and continuously in order to track different stages of CBRI and in order to rightly interpret resistivity values. The limitation is that the reservoir must be a closed boundary-meaning no fluid flow across its boundary. Also for application in production wells, it can be applicable as long as there is no water production and also when a no flow boundary exists. This is because water saturation change from outer source must be avoided for the data interpretation to be valid.

Resistivity and temperature logs have always been used in many fields for evaluation of reservoir performance, and detection of leaks and flow path. It is shown in the present disclosure that such resistivity logs can be combined with temperature logs to give an indication of CBRI essentially the onset of scale formation. Successful interpretation of combined temperature and electrical signature can be a breakthrough in the understanding of CBRI in situ and real-time in $CO_2$ sequestration projects. It is a promising technique for real-time and in situ scale monitoring. Further, other experiments conducted at constant $CO_2$ pressure and also the inclusion of online pH meter will help to match or correlate increase in pH to resistivity and temperature log as increase in pH is known to favor scale formation.

3. Monitoring of scale or lime build up in storage tanks, pipelines, and tubular used for water: the disclosure is also applicable to the mentioned equipment when the relevant sensors such as resistivity/resistance, temperature, pH, pressure etc. are installed and monitored. The challenge is protecting the equipment from external disturbances such as heat and cold as they will affect the monitored data.

The invention claimed is:

1. A well-bore monitoring process, comprising
logging the temperature of a soil, rock, and brine mixture present in a carbonate formation continuously, and
simultaneously logging the resistivity of the soil, rock, and brine mixture in the carbonate formation continuously,
interpreting the logged temperature and the logged resistivity to identify dissolution of rock into the mixture and precipitation of scale from the mixture by concurrent events in the logged temperature and the logged resistivity, and
injecting an antiscalant into the well-bore based on the interpreted temperature and resistivity logs,
wherein the simultaneous logging of the temperature and the resistivity is conducted in a well-bore in the carbonate formation.

2. The well-bore monitoring process of claim 1, wherein the temperature is logged with a thermocouple.

3. The well-bore monitoring process of claim 1, wherein the resistivity is logged with a LCR meter.

4. The well-bore monitoring process of claim 1, wherein the concurrent events comprise a simultaneous increase or decrease in the logged temperature and resistivity with respect to baseline values.

5. The well-bore monitoring process of claim 4, wherein the concurrent events comprise a % deviation of greater than or equal to 5% with respect to a baseline value in resistivity and a % deviation of greater than or equal to 1% with respect to a baseline value of temperature.

6. The well-bore monitoring process of claim 1, wherein the well-bore is in at least one carbon sink selected from the group consisting of an oilfield, a saline aquifer, an ocean water reservoir, and a landfill.

7. The well-bore monitoring process of claim 1, wherein the carbonate formation is limestone.

8. The well-bore monitoring process of claim 7, wherein the simultaneous logging is performed in the limestone, and not in a formation fluid in the well-bore.

9. The well-bore monitoring process of claim 1, further comprising
logging the pH of the soil, rock and brine mixture in the well-bore with a pH meter continuously,
wherein the combined logging of temperature, resistivity, and the pH is conducted downhole in the well-bore for detecting the dissolution of rock into the mixture and precipitation of scale from the mixture by concurrent events in the logged temperature, the logged resistivity, and the logged pH of the mixture.

10. The well-bore monitoring process of claim 1, further comprising monitoring at least one additional parameter selected from the group consisting of pressure changes, salinity content, and flow rate changes.

11. The well-bore monitoring process of claim 10, wherein the salinity content is monitored with an inductively coupled plasma-atomic emission spectrometer.

12. The well-bore monitoring process of claim 1, wherein the antiscalant is EDTA.

13. An automated well-bore monitoring and scale inhibition process, comprising
logging the temperature of a soil, rock, and brine mixture present in a carbonate formation continuously, and
simultaneously logging the resistivity of the soil, rock, and brine mixture in the carbonate formation continuously,
interpreting the logged temperature and the logged resistivity to identify dissolution of rock into the mixture and precipitation of scale from the mixture by concurrent events in the logged temperature and the logged resistivity,
injecting an antiscalant into the well-bore based on the interpreted temperature and resistivity logs,
wherein the simultaneous logging of the temperature and the resistivity is conducted in a well-bore in the carbonate formation,
and wherein a computer automates the injecting based on the interpreted concurrent events in logged temperature and logged resistivity.

14. The automated process of claim 13, wherein the concurrent events comprise a % deviation of greater than or equal to 5% with respect to a baseline value in resistivity and a % deviation of greater than 1% with respect to a baseline value of temperature.

* * * * *